Patented Dec. 1, 1931

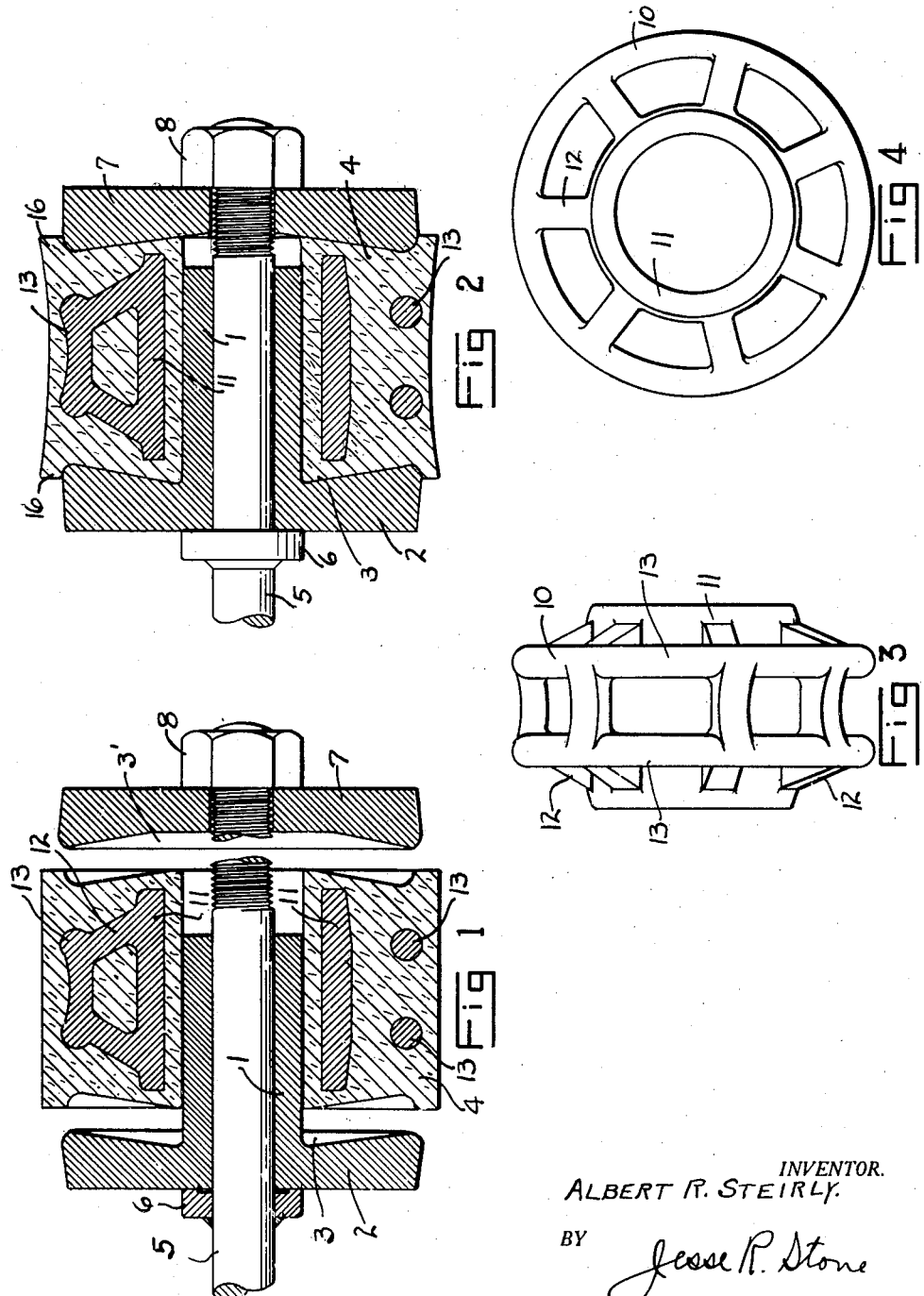

1,833,920

UNITED STATES PATENT OFFICE

ALBERT R. STEIRLY, OF HOUSTON, TEXAS

PUMP PISTON

Application filed September 30, 1929. Serial No. 396,071.

My invention relates to pump pistons and particularly to pistons such as are employed in double acting pumps of the slush pump type.

In the operation of slush pumps it is desirable to provide a piston in which the seal between the piston and the cylinder liner is of comparatively soft compressible material such as rubber but the pressures to be handled in pumps of this type are so high that ordinary packing rings of rubber are not capable of withstanding the same without material support.

I have devised a piston of compressible material which is designed to be reinforced by rigid material so as to withstand high pressures, and still assure that no metal can come in contact with and score the cylinder liner.

I also desire to provide a packing member for my piston the ends of which are adapted to be placed under compression when it is clamped in operating position, so as to preserve a close seal with the walls of the liner.

I have as a further object to form a pump piston in which the packing member is easily removable so that it can be replaced easily without loss of time.

I also provide a packing member which can be easily inserted within the pump liner and expanded into packing position after it has been thus inserted.

In the drawings herewith:

Fig. 1 is a central longitudinal section through a piston embodying my invention.

Fig. 2 is a similar view showing the piston clamped into operating position.

Fig. 3 is a side view of the metallic reinforcing ring.

Fig. 4 is an end view of the reinforcing ring.

In constructing my piston I provide a piston body 1 which is cylindrical in shape and which has a radial flange 2 at its outer end. Said flange has its inner face slightly undercut at 3 making the same slightly dished to better engage the packing ring 4. The body 1 is formed to receive the piston rod 5 and a boss or stop member 6 is secured to the rod by welding or otherwise and acts to limit the movement of the body member in that direction.

The follower plate 7 is shaped to fit over the end of the piston rod to clamp against the packing member 4. The plate is also dished at 3' on its inner face to engage the packing member. A nut 8 is formed to screw upon the rod 5 to clamp the follower plate toward the packing ring.

The packing member 4 is composed largely of rubber or other similar composition and is moulded upon a skeleton ring 10 of metal or other rigid construction. The ring 10 is shown in Figs. 3 and 4. It includes a sleeve 11 of somewhat larger internal diameter than is the external diameter of the piston body 1. On the outer surface of the sleeve are spokes 12 connecting the rings 13 with the sleeve body 11. Fig. 3 shows the spacing of these rings and the spokes so that an open frame work is formed. It is upon this frame or support structure that the rubber packing 4 is molded. Figs. 1 and 2 show central vertical sections of the frame work with the upper side passing thru the spokes 12 and the rings 13 while the lower half passes thru an area between the spokes and only the sleeve 11 and rings 13 are visible in section.

From the foregoing description it will be seen that the flexible material is adequately supported by the metal ring and will be securely fastened to the ring as it is molded into the openings and passages between the rings 13, sleeve 11 and spokes 12. Attention is directed to Figs. 1 and 2 where it will be seen that a layer of rubber is also formed on the inner surface of the sleeve 11 and of such thickness as to allow the insertion of the body 1. Thus the support ring 10 will be floating in rubber which will prevent the rubber from being loosened therefrom.

Figs. 1 and 2 show the rubber packing ring 4 as formed with annular depression 15 at each end to receive the radial flange 2 and follower plate 7. From Fig. 1 however it will be apparent that these depressions are of less diameter than that of the follower plates. Also that the packing ring in normal position has a straight contour on its outer face. The follower plates are shown as being of less diameter on their outer faces than on the inner side which is to contact the packing ring. Fig. 2 shows the piston in assembled operative position. It is understood that the parts are slipped onto the piston rod 5 while it is in the pump cylinder as shown in Fig. 1. The nut 8 is then tightened until the parts are forced together and the piston assumes the shape shown in Fig. 2. In this position the plates 2 and 7 have been forced into the depressions 15 and due to the difference in diameter, the packing material has been compressed by the plates and forced outwardly. This outward movement extends the lips 16 of the packing so that the ring is then concaved between its ends. The lips 16 will thus form a tight seal with the pump liner and a very efficient operation will result. When the lips 16 become worn it is only necessary to tighten the nut 8 in order to further expand the lips.

The particular advantages of the present piston are that it may be readily inserted into the pump liner in the manner illustrated in Fig. 1. It may then be expanded to form a complete seal and is thereafter adjustable to compensate for wear. The reenforcing ring 10 is also of advantage in providing a firm and rigid support for the packing material.

What I claim as new is:

1. A pump piston comprising a cylindrical body, a flange thereon, a piston rod, a follower plate on said rod adjacent the end of said body, a packing ring of compressible material on said body between said flange and said plate, and a skeleton reinforcing member in said ring including an inner sleeve, an outer ring and spokes connecting said sleeve and outer ring, said packing ring being moulded about said member.

2. A pump piston comprising a cylindrical body, a flange thereon, a piston rod, a follower plate on said rod adjacent the end of said body, a packing ring of compressible material on said body between said flange and said plate, and a skeleton reinforcing member in said ring including an inner sleeve, an outer ring and spokes connecting said sleeve and outer ring, said packing ring being moulded about said member, said skeleton member being entirely surrounded on its outer and inner sides by said ring.

3. A pump piston comprising a piston body, a flange thereon at one end, a follower plate at the other end, a packing ring adapted to be clamped between said flange and plate, said ring being of larger diameter than said flange and plate, and a reinforcing member in said ring including a sleeve larger than the internal diameter than said ring, an outer rigid annular member, and spokes connecting said sleeve and said member.

4. A pump piston comprising a piston body, a flange thereon at one end, a follower plate at the other end, a packing ring adapted to be clamped between said flange and plate, said ring being of larger diameter than said flange and plate, and a reinforcing member in said ring including a sleeve of larger internal diameter than the inside of said ring, an outer rigid annular member, and spokes connecting said sleeve and said member, said flange and plate being adapted to be clamped within recesses in the ends of said ring.

5. A pump piston, a packing ring of compressible material thereon, said ring having a rigid skeleton frame therein including an inner sleeve, a pair of annular rims outside said sleeve, and spokes connecting said sleeve and rims.

6. A pump piston, a packing ring thereon comprising a frame of rigid material including an inner annular member and outer annular members and spokes connecting said members and a packing sleeve of rubber moulded about said frame to completely enclose the same, said sleeve being cylindrical in shape.

7. A pump piston, a packing ring thereon comprising a frame of rigid material including an inner annular member and outer annular members and spokes connecting said members and a packing sleeve of rubber moulded about said frame to completely enclose the same.

8. A pump piston including a piston body, a flange thereon, a piston rod, a follower plate on said rod, a packing ring on said body normally of cylindrical periphery, and means to compress the said ring between said plate and flange and force the ends thereof outwardly to form a piston ring concaved between its ends.

9. A pump piston including a piston body, a flange thereon, a piston rod, a follower plate on said rod, a packing ring on said body normally of cylindrical periphery, the ends of said ring being recessed slightly adjacent said flange and plate, and means to compress the said ring between said plate and flange and force the ends thereof outwardly to form a piston ring concaved between its ends.

10. A pump piston including a piston body, a packing ring of compressible material thereon, said ring being normally cylindrical on its outer periphery, means to clamp and hold said ring to said body adapted also to extend the ends of the said ring laterally to increase the outer circumference of said ends, and reenforcing means within said ring including an inner sleeve, a pair of annular rims outside said sleeve, and spokes connecting said sleeve and rims.

11. A pump piston including a packing ring body, a comparatively thin rim at each end thereof projecting beyond the body of said ring, and dished plates adapted to abut against the end of said ring and expand said lips to a diameter greater than the body of said ring.

12. A pump piston including a packing ring body, a comparatively thin rim at each end thereof projecting beyond the body of said ring, and dished plates adapted to abut against the end of said ring and expand said lips to a diameter greater than the body of said ring, whereby a sealing area is created to engage the cylinder wall.

13. A pump piston including a follower head and plate having dished inner faces, a packing ring having recessed ends to substantially fit said head and plate, said recesses being of slightly less diameter than said head and plate, and means to move said head and plate into said recesses to expand the ends of said ring.

In testimony whereof I hereunto affix my signature this 10th day of September, A. D. 1929.

ALBERT R. STEIRLY.